N. E. BADGLEY.
Cotton-Planter.
No. 59,339. Patented Nov. 6, 1866.
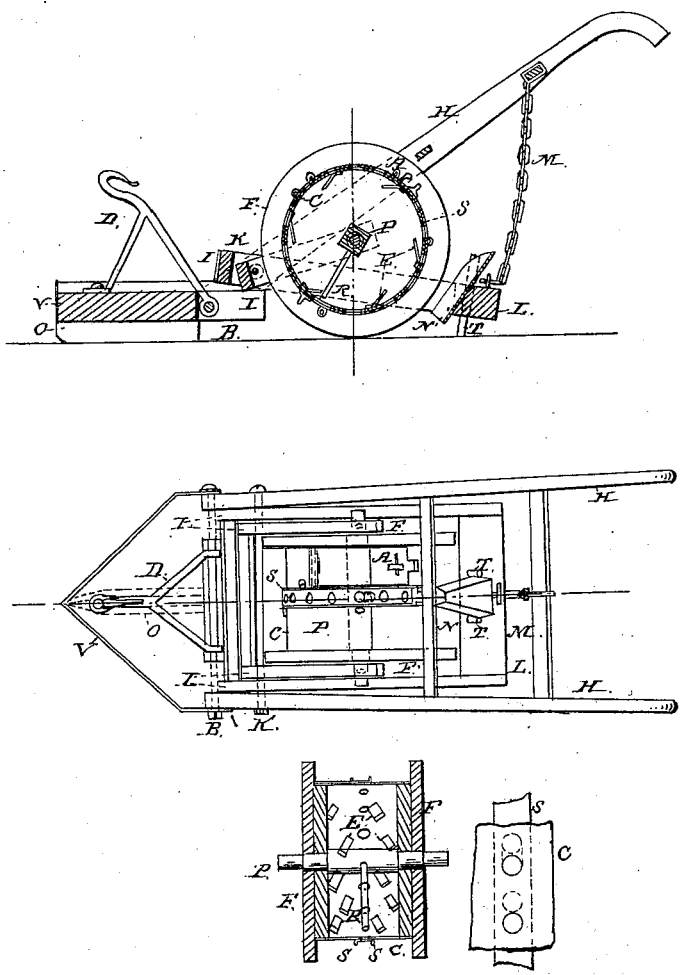
WITNESSES:
Thomas G. Orwig.
Chas. H. Rogers.
INVENTOR:
Nathan E. Badgley.

UNITED STATES PATENT OFFICE.

NATHAN E. BADGLEY, OF NEW YORK, N. Y.

IMPROVEMENT IN COTTON-SEED PLANTERS.

Specification forming part of Letters Patent No. 59,339, dated November 6, 1866; antedated October 4, 1866.

*To all whom it may concern:*

Be it known that I, NATHAN E. BADGLEY, of New York city, in the county of New York and State of New York, have invented a new and useful Machine for Planting Cotton-Seed; and I do hereby declare that the following is a full, clear, and exact description of the construction and operation of the same, reference being had to the annexed drawings, making a part of this specification, in which—

Figure 1 is a vertical longitudinal section; Fig. 2, a perspective view from above; Fig. 3, a horizontal section of hopper, and Fig. 4 a section of the cylindrical hopper and sliphook.

The nature of my invention consists in the manner of uniting the handles with the open frame, a cylindrical hopper with elevating agitators on the interior and a slip-hook exteriorly, to regulate the planting, rolling upon the ground around a permanent shaft supported by flanged heads, and the construction of the adjustable coverer.

To enable others skilled in the art to make and use my invention, I will proceed to describe its construction and operation.

The opener-frame V, with its opener O, smooth off the surface and form the furrow to receive the seed. The handles H are fastened to the opener-frame by letting the handles into gains on either side of the opener-frame, and the bolt B passing through the ends of the handles across the whole breadth of the opener-frame, thereby giving great strength to this part of the machine. It also forms a permanent fastening for the draft-hook D.

The revolving hopper is constructed of the cylinder C and flanged heads F. There are a number of holes around the center of the cylinder, through which the seed are discharged and regulated or shut off at will by means of the slip-hoop S. Four of said holes are oblong, as shown in Fig. 4, so that openings may be left only where the oblong holes are when all the rest are closed, in order to spot or plant less seed.

On the interior of the cylinder are a number of elevating-agitators, E, spirally set, so as to cast the seed toward the middle of the hopper, thereby aiding their discharge, the hopper-rolls upon the ground revolving around the permanent shaft P, through which is the stationary rod R, which facilitates the exit of the seed.

A is the door to the hopper. The coverer L and its teeth T are so constructed as to cover the seed and leave the ground in a smooth condition. The conductor N prevents the seed from flying over the coverer, and returns it to the furrow. The hopper and coverer are supported by adjustable frames I I, which are attached in front by the bolt K, passing through the handles, and sustained in the rear by the chain M.

What I claim as my invention, and desire to secure by Letters Patent, is—

1. The construction of the opener-frame V, with its draft-hook D, and the manner of fastening the handles thereto.

2. The revolving cylindrical flanged-head hopper around a permanent shaft, with its elevating-agitators E and stationary rod R.

3. The slip-hoop S, with holes to regulate the planting either in drill or spots, as herein described.

4. The adjustable coverer L, with its teeth T, and conductor N, attached as herein described.

5. The combination of the several parts and devices as herein described and substantially set forth.

NATHAN E. BADGLEY.

Witnesses:
 THOMAS G. ORWIG,
 CHAS. H. ROGERS.